United States Patent
Tajima et al.

(10) Patent No.: US 11,886,205 B2
(45) Date of Patent: Jan. 30, 2024

(54) SERVO MOTOR CONTROLLER

(71) Applicant: FANUC CORPORATION, Yamanashi (JP)

(72) Inventors: Daisuke Tajima, Yamanashi (JP); Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 850 days.

(21) Appl. No.: 16/924,599

(22) Filed: Jul. 9, 2020

(65) Prior Publication Data
US 2021/0011498 A1    Jan. 14, 2021

(30) Foreign Application Priority Data

Jul. 10, 2019 (JP) .................................. 2019-128299

(51) Int. Cl.
| | | |
|---|---|---|
| *G05D 13/62* | (2006.01) | |
| *G05D 3/12* | (2006.01) | |
| *G01D 5/347* | (2006.01) | |
| *G01D 5/12* | (2006.01) | |

(52) U.S. Cl.
CPC ............. *G05D 13/62* (2013.01); *G05D 3/125* (2013.01); *G01D 5/12* (2013.01); *G01D 5/3473* (2013.01)

(58) Field of Classification Search
CPC .......... G05D 13/62; G05D 3/125; G01D 5/12; G01D 5/3473; G01D 5/24471; G01D 5/24457; G01D 5/244; H02P 6/16

USPC ......................................... 318/565, 563, 560
See application file for complete search history.

(56) References Cited

U.S. PATENT DOCUMENTS

| | | | | |
|---|---|---|---|---|
| 7,994,749 B2* | 8/2011 | Miyashita | .............. | G01D 5/145 318/638 |
| 8,471,506 B2* | 6/2013 | Manabe | .................... | H02P 6/16 318/400.04 |
| 9,372,236 B2* | 6/2016 | Lee | ....................... | G01R 31/343 |

FOREIGN PATENT DOCUMENTS

| | | |
|---|---|---|
| JP | H02-147910 A | 6/1990 |
| JP | H06-288791 A | 10/1994 |
| JP | H09-280891 A | 10/1997 |
| JP | H11-142448 A | 5/1999 |
| JP | H11-264742 A | 9/1999 |

* cited by examiner

*Primary Examiner* — David Luo
(74) *Attorney, Agent, or Firm* — Studebaker & Brackett PC

(57) ABSTRACT

A servo motor controller capable of eliminating inconvenience that the position of a shaft or the like of a servo motor is detected or set erroneously due to influence of noise or the like is provided. A servo motor controller that detects Z-phase signals of an incremental-type encoder that detects rotation of a servo motor to perform driving control of the servo motor includes: a position detection unit that detects a reference position of a rotating shaft of the servo motor on the basis of the Z-phase signal of the encoder; a signal interval detection unit that measures intervals of a plurality of detected Z-phase signals; and an abnormality determination unit that determines that the Z-phase signal is abnormal when the interval measured by the signal interval detection unit is equal to or larger than a prescribed threshold.

4 Claims, 6 Drawing Sheets

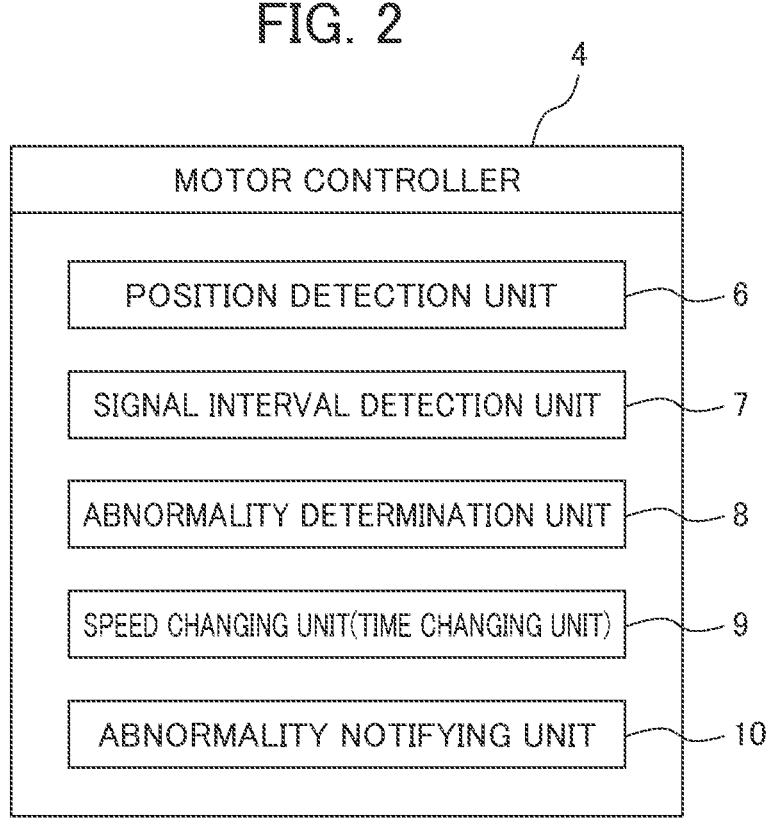

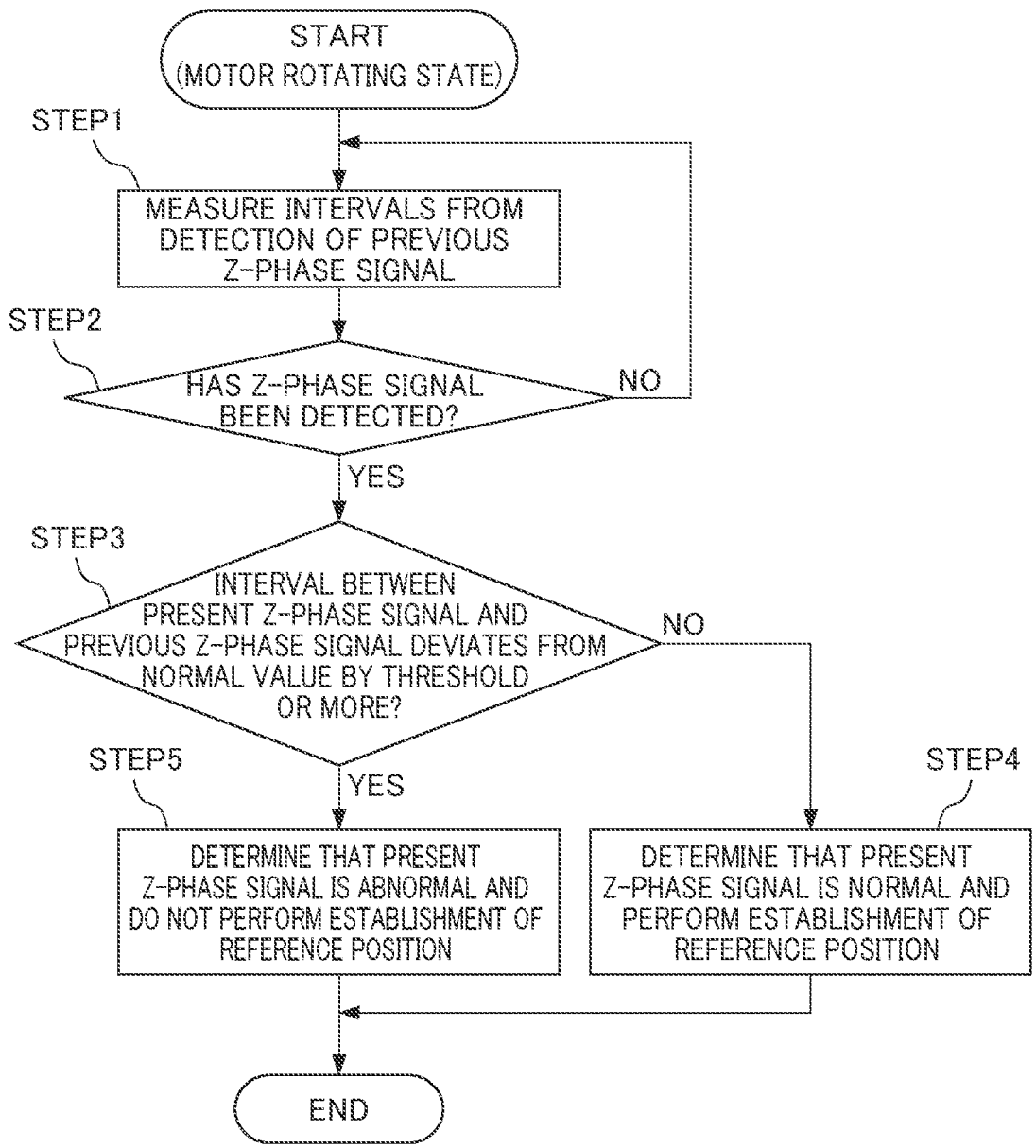

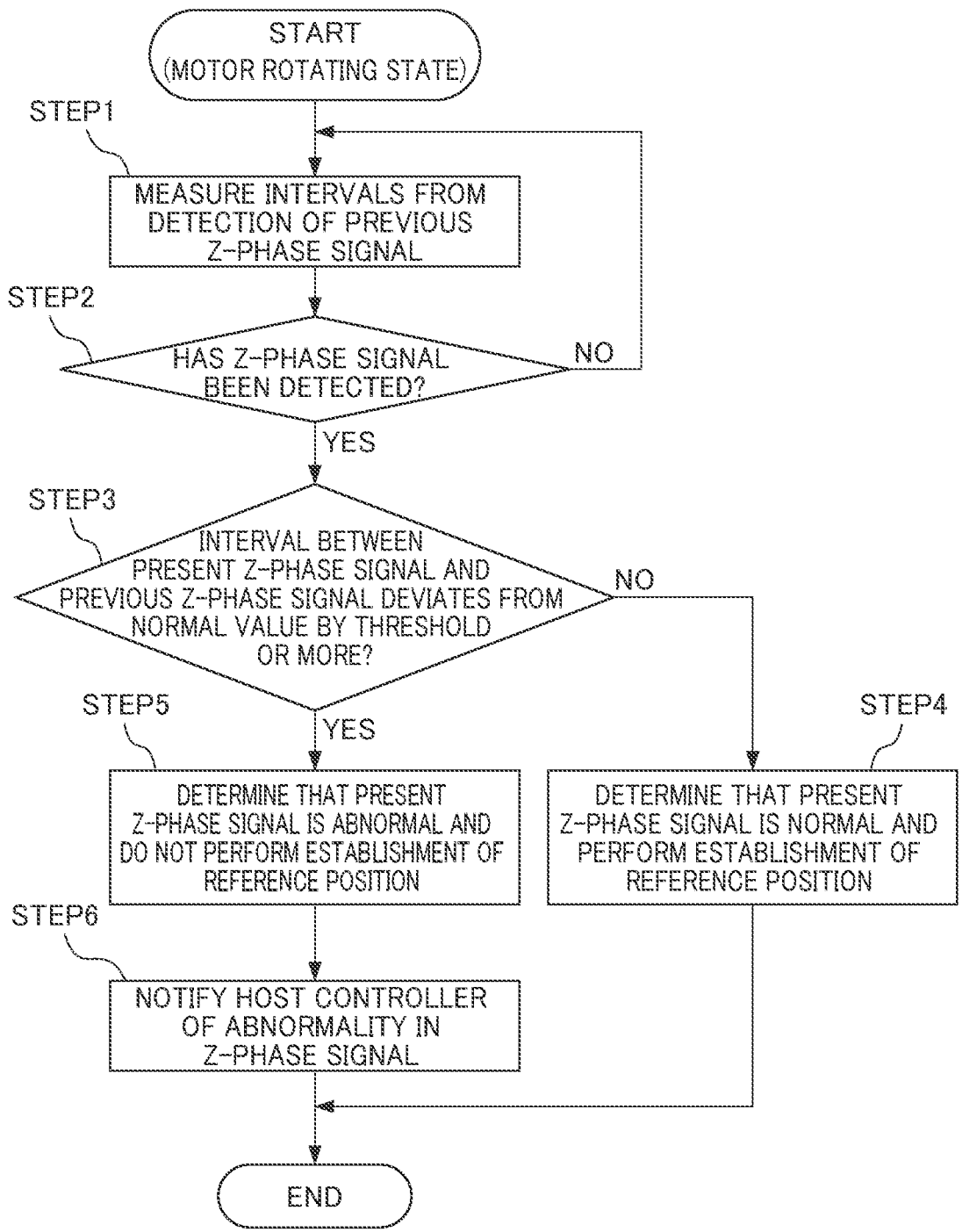

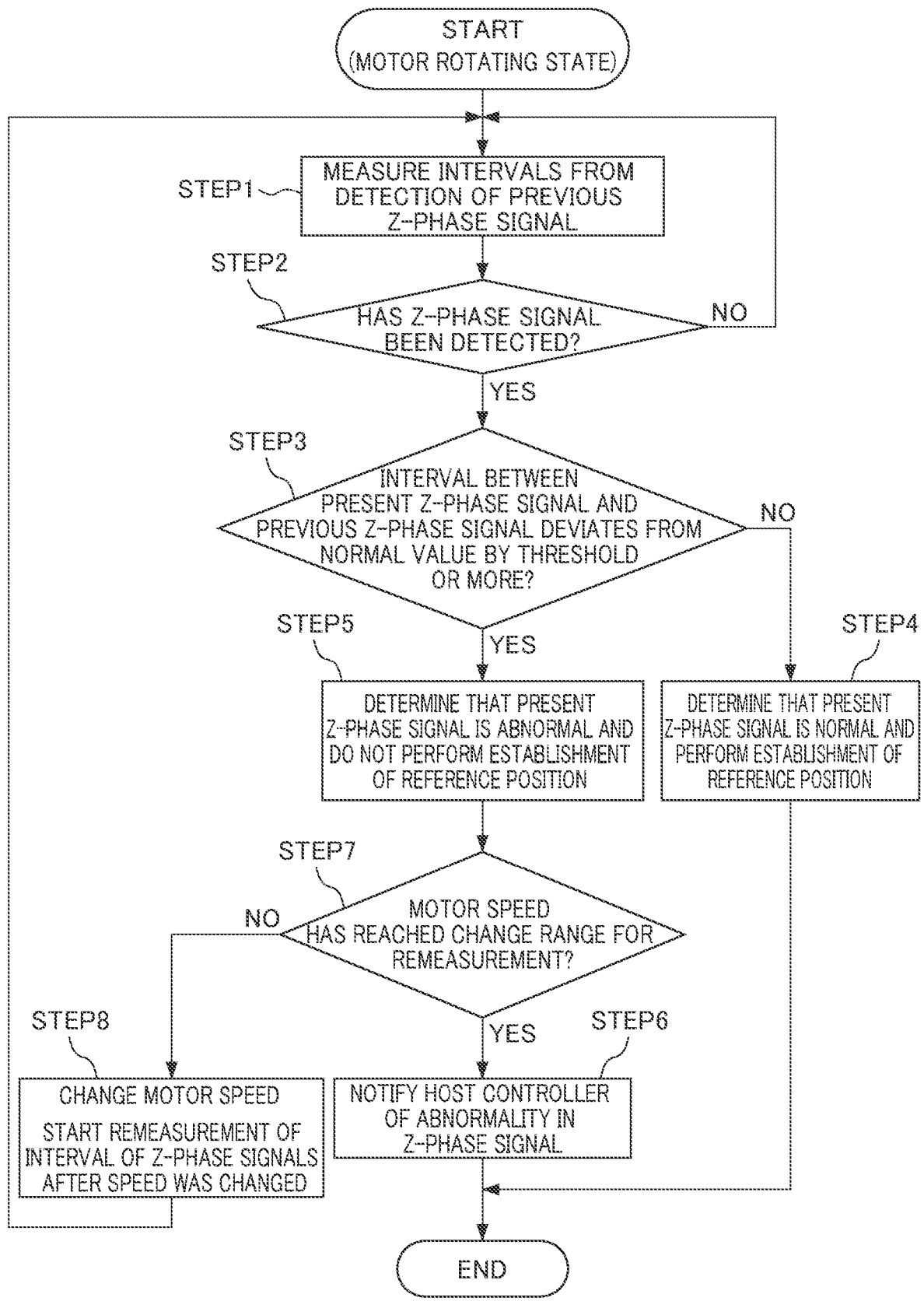

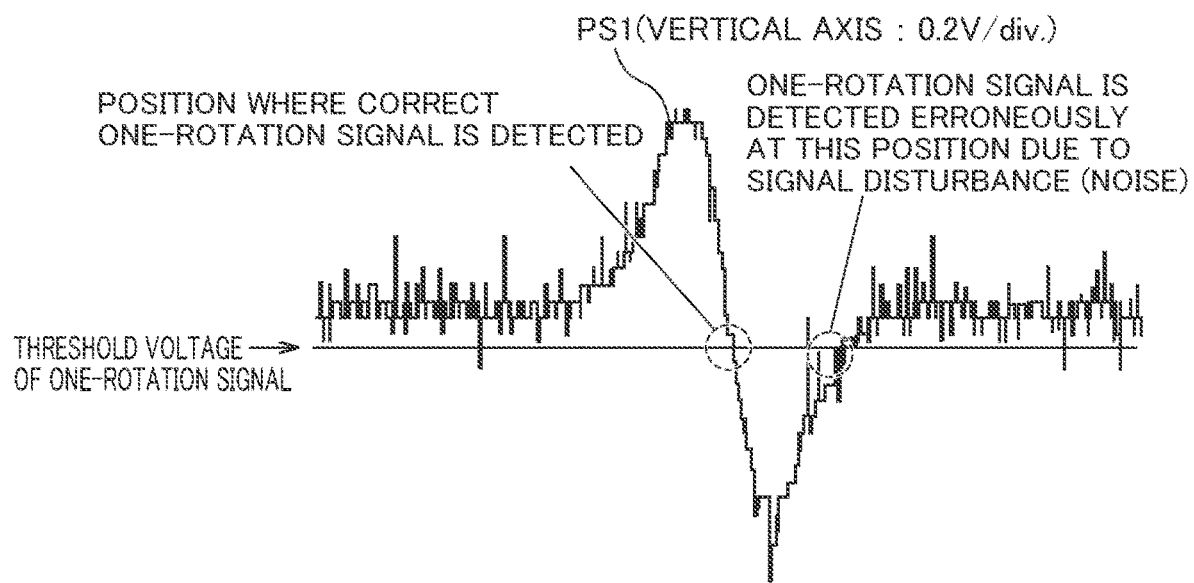

SERVO MOTOR CONTROLLER

This application is based on and claims the benefit of priority from Japanese Patent Application No. 2019-128299, filed on 10 Jul. 2019, the content of which is incorporated herein by reference.

BACKGROUND OF THE INVENTION

Field of the Invention

The present invention relates to a servo motor controller.

Related Art

For example, a rotation amount, a rotation speed, a torque, and the like of a servo motor of an industrial machine such as a servo motor for driving a spindle of a machine tool are controlled. Moreover, a servo motor controller detects the position of a motor and the position of a magnetic pole (the phase (angle) of a motor magnet) with the aid of a detector, determines a voltage command value on the basis of various feedback values from the detector, and applies a voltage modulated by a pulse width modulation (PWM) method whereby driving of the motor is controlled.

Moreover, an incremental encoder (a position detector) frequently used in an AC servo motor includes, for example, a light emitting element, a rotating slit plate, a light receiving element, a waveform shaping circuit, and a signal transmitting circuit. Moreover, two-phase signals having a phase difference of 90°, an origin reference Z-signal that outputs one pulse per rotation, and a commutation signal for phase excitation switching of an AC servo motor are used as output signals.

Patent Document 1 discloses a rotary encoder including an original signal output unit that outputs incremental signals of the two phases A and B having a phase difference of 90°, a reference signal Z indicating the origin during one rotation, phase excitation switching signals (commutation signals) CS1, CS2, and CS3 for a three-phase AC servo motor, a power ON/OFF detection circuit that detects an on/off state of a main power source of the encoder, an A and B-phase direction discrimination circuit that detects edges of the two phases A and B to output count-up and count-down pulses according to the phases of the two phases A and B, an up-down counter that preloads initial count data according to output of the power ON/OFF detection circuit and counts output pulses of the A and B-phase direction discrimination circuit, an initial value detection circuit that detects initial data preloaded to the up-down counter according to the levels of the two phases A and B, an abnormality detection circuit that detects presence of an encoder malfunction on the basis of the output from the A and B-phase direction discrimination circuit and the Z-phase and the phases CS1, CS2, and CS3, a data latch circuit that latches the Z-phase and the phases CS1, CS2, and CS3 from the original signal output unit, the data from the up-down counter, and the status from the abnormality detection circuit, a Z-signal conversion circuit that samples the Z-phase from the original signal output unit to output the state of the Z-phase, and a parallel-serial conversion circuit that converts the count data, the phases CS1, CS2, and CS3, and the status output from the data latch circuit and the data output from the Z-signal conversion circuit to serial data and outputs the serial data.

Patent Document 1: Japanese Unexamined Patent Application, Publication No. H09-280891

SUMMARY OF THE INVENTION

On the other hand, for example, as illustrated in FIG. 6, there is a case in which, when an operation (an absolute (reference) position establishment operation) of detecting a Z-phase signal to establish the position of a shaft of a servo motor is performed in order to perform position control of the servo motor which uses an incremental encoder as a position detector, it is not possible to detect the Z-phase signal at a correct position due to an influence of noise depending on the speed during detection of the Z-phase signal. As a result, in this case, an error occurs in the absolute position and it is difficult to perform position control with high accuracy.

An embodiment of a servo motor controller according to the present disclosure is a servo motor controller that detects Z-phase signals of an incremental-type encoder that detects rotation of a servo motor to perform driving control of the servo motor, including: a position detection unit that detects a reference position of a rotating shaft of the servo motor on the basis of the Z-phase signal of the encoder; a signal interval detection unit that measures intervals of a plurality of detected Z-phase signals; and an abnormality determination unit that determines that the Z-phase signal is abnormal when the interval measured by the signal interval detection unit is equal to or larger than a prescribed threshold.

According to an embodiment of the servo motor controller according to the present disclosure, by measuring the interval of a plurality of Z-phase signals detected in a Z-phase signal detection operation and checking whether the interval exceeds a prescribed threshold (a range of thresholds), it is possible to determine presence of abnormalities in the Z-phase signal. In this way, it is possible to eliminate inconvenience that the position of a shaft or the like of the servo motor 3 is detected or set erroneously due to influence of noise or the like, and as a result, it is possible to perform position control with high accuracy and high reliability.

BRIEF DESCRIPTION OF THE DRAWINGS

FIG. 2 is a block diagram illustrating a servo motor controller according to an embodiment.

FIG. 3 is a flowchart illustrating a method of determining presence of abnormality in a Z-phase signal using a servo motor controller according to an embodiment.

FIG. 4 is a flowchart illustrating a method of determining presence of abnormality in a Z-phase signal using a servo motor controller according to an embodiment.

FIG. 5 is a flowchart illustrating a method of determining presence of abnormality in a Z-phase signal using a servo motor controller according to an embodiment.

FIG. 6 is a diagram used for describing detection of errors resulting from influence of noise or the like.

DETAILED DESCRIPTION OF THE INVENTION

Figure 1:
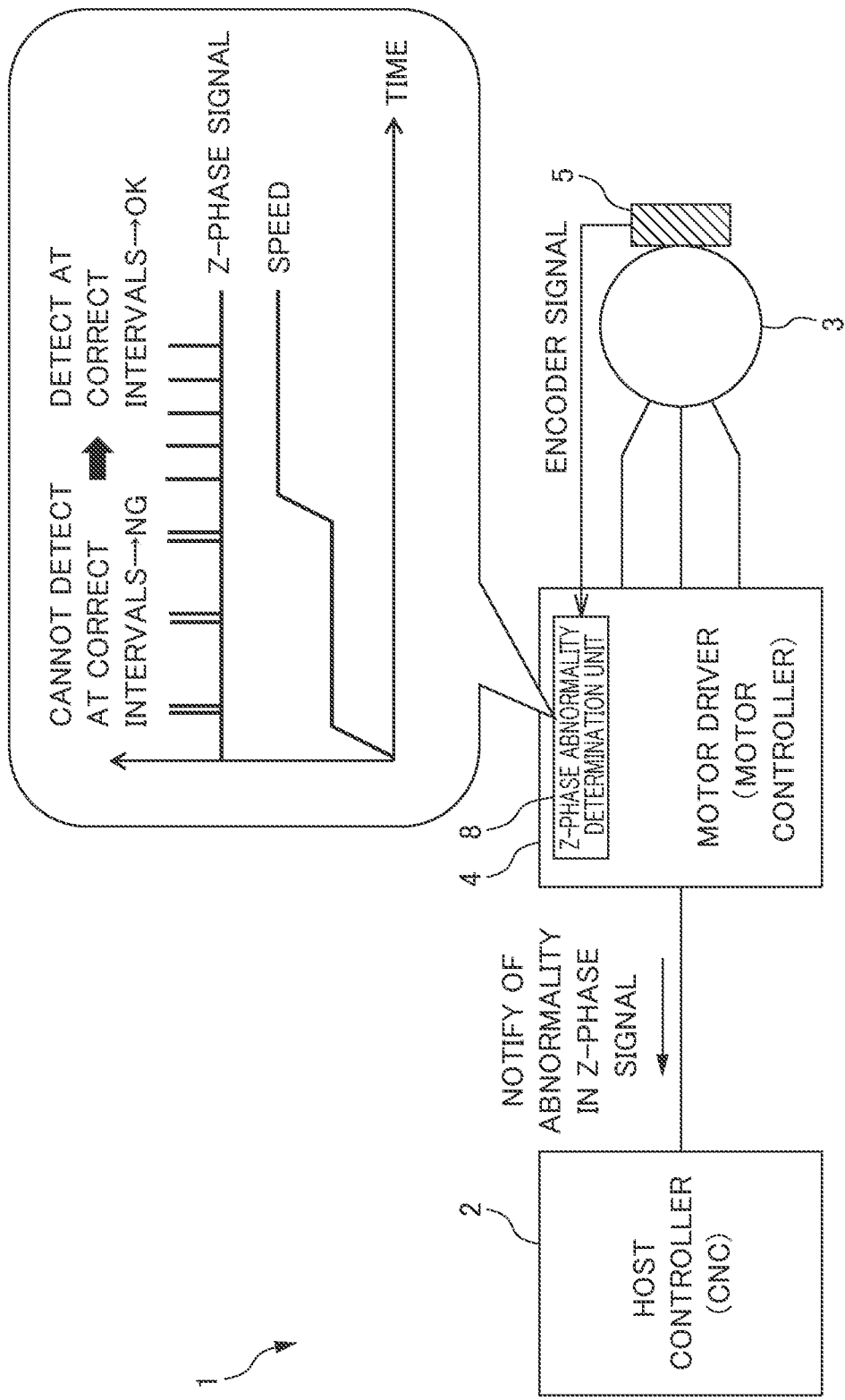
FIG. 1 is a diagram illustrating a servo motor control system according to an embodiment.

Hereinafter, a servo motor controller according to an embodiment will be described with reference to FIGS. 1 to 5.

In the present embodiment, description will be given assuming that an industrial machine is a machine tool and driving of a spindle or the like of the machine tool is controlled by a servo motor controller. However, the servo motor controller according to the present invention may naturally be applied to driving control of a servo motor used in other industrial machines such as a robot, a conveyer, a measuring instrument, a testing device, a press, a press-fitting machine, a printing machine, a die casting machine, an injection molding machine, a food machine, a packaging machine, a welding machine, a washing machine, a painting machine, an assembly device, a mounting machine, a wood-working machine, a sealing device, and a cutting machine.

For example, as illustrated in FIG. 1, a machine tool (industrial machine) control system 1 according to the present embodiment includes a computerized numerical control (CNC) 2 which is a host controller, a servo motor controller (a motor controller of a servo amplifier or the like) 4 that controls driving of a servo motor (a driving unit) 3 of a machine tool on the basis of commands of the CNC 2, and an incremental-type encoder (incremental encoder) 5 that detects rotation of the servo motor 3.

As illustrated in FIGS. 1 and 2, the servo motor controller 4 according to the present embodiment includes a position detection unit 6 that detects a reference position of a rotating shaft of the servo motor 3 on the basis of a Z-phase signal of the encoder 5, a signal interval detection unit 7 that measures intervals of a plurality of detected Z-phase signals, and an abnormality determination unit 8 that determines that the Z-phase signal is abnormal when the interval measured by the signal interval detection unit 7 is equal to or larger than a prescribed threshold.

Furthermore, the servo motor controller 4 according to the present embodiment includes a speed changing unit 9 that changes the speed of the servo motor 3 when the abnormality determination unit 8 determines that the Z-phase signal is abnormal and an abnormality notifying unit 10 that notifies the CNC 2 or the like of a host controller of an abnormality when the interval of the Z-phase signals is equal to or larger than a prescribed threshold with respect to a latest detection value or an average value of detection values for a prescribed period at a stage where the speed of the servo motor 3 was changed to a prescribed speed, and the abnormality determination unit 8 determines that the Z-phase signal is abnormal.

When position control is performed using the servo motor controller 4 according to the present embodiment having the above-described configuration, as illustrated in FIG. 3 (FIGS. 1 and 2), the encoder 5 starts detecting the rotation position of the shaft of the servo motor 3 with driving of the servo motor 3 and the position detection unit 6 detects the reference position of the rotating shaft of the servo motor 3 on the basis of a Z-phase signal of the encoder 5.

In this case, in the servo motor controller 4 of the present embodiment, the signal interval detection unit 7 receives a plurality of Z-phase signals in a rotating state of the servo motor 3 and starts measuring the time elapsed until a subsequent Z-phase signal (a present Z-phase signal) is detected after a previous Z-phase signal was detected (STEP1).

When the Z-phase signal is detected (STEP2) and the signal interval detection unit 7 measures the interval between the previous Z-phase signal and the subsequent Z-phase signal, the abnormality determination unit 8 checks whether the interval exceeds a threshold (an upper-lower limit range of thresholds) set in advance using a normal value as a reference (STEP3).

When the interval does not exceed the threshold, the abnormality determination unit 8 determines that the present Z-phase signal is normal and performs establishment of a reference position (establishment of an absolute position) (STEP4).

When the interval is equal to or larger than the threshold, the abnormality determination unit 8 determines that the present Z-phase signal is abnormal and does not perform establishment of a reference position (STEP5).

In the present embodiment, it is checked whether the latest detection value of the interval of the Z-phase signals is equal to or larger than a prescribed threshold to determine presence of an abnormality. However, it may be checked whether an average value of the detection values of a plurality of Z-phase signals detected in a prescribed period is equal to or larger than a prescribed threshold to determine presence of an abnormality.

In the servo motor controller 4 of the present embodiment, as illustrated in FIG. 4, when the abnormality determination unit 8 determines that the Z-phase signal is abnormal, it is preferable that the abnormality notifying unit 10 notifies the CNC 2 or the like of a host controller of an abnormality (STEP6).

Furthermore, in the servo motor controller 4 of the present embodiment, as illustrated in FIG. 5 (FIG. 1), when the abnormality determination unit 8 determines that the Z-phase signal is abnormal, the speed of the servo motor 3 is raised or lowered within a prescribed range, and measurement of the interval of Z-phase signals after the speed was changed is performed again (retried) (STEP7, STEP8, and STEP1) and abnormality determination is performed again. A plurality of speed change values is set in advance within a prescribed range, and measurement of the interval of Z-phase signals at the respective speed change values is performed again (retried) repeatedly.

Therefore, in the servo motor controller 4 of the present embodiment, by measuring the interval of a plurality of Z-phase signals detected in a Z-phase signal detection operation and checking whether the interval exceeds a prescribed threshold (a range of thresholds), it is possible to determine presence of abnormalities in the Z-phase signal. In this way, it is possible to eliminate inconvenience that the position of a shaft or the like of the servo motor 3 is detected or set erroneously due to influence of noise or the like, and as a result, it is possible to perform position control with high accuracy and high reliability.

When the abnormality determination unit 8 determines that the Z-phase signal is abnormal, by changing the speed of the servo motor 3 and performing (retrying) measurement of the interval of the Z-phase signals again using the signal interval detection unit 7, it is possible to determine presence of abnormalities in the Z-phase signal with higher accuracy.

Since the servo motor controller 4 includes the abnormality notifying unit 10 that notifies the CNC 2 or the like of a host controller of an abnormality when the abnormality determination unit 8 determines that the Z-phase signal is abnormal, it is possible to inform an operator of the abnormality quickly to stop the servo motor 3 and to generate an alarm and to prevent an unexpected dangerous operation of the machine tool (an industrial machine).

While an embodiment of the servo motor controller has been described, the present invention is not limited to the above-described embodiment but can be changed appropriately without departing from the spirit thereof.

For example, in the present embodiment, when the abnormality determination unit 8 determines that the Z-phase signal is abnormal, the speed changing unit 9 changes the speed of the servo motor 3, the signal interval detection unit 7 measures the interval of the Z-phase signals again in a stage where the speed of the servo motor 3 was changed to a prescribed speed, and the abnormality determination unit 8 and the abnormality notifying unit 10 determines presence of an abnormality and notifies of an abnormality. In contrast, the speed may be maintained constant, the times at which the Z-phase signals are detected may be detected, and the presence of an abnormality may be determined on the basis of the detection times (intervals) of a plurality of Z-phase signals.

EXPLANATION OF REFERENCE NUMERALS

1: Servo motor control system
2: Host controller (CNC)
3: Servo motor
4: Servo motor controller
5: Encoder
6: Position detection unit
7: Signal interval detection unit
8: Abnormality determination unit
9: Speed changing unit
10: Abnormality notifying unit

What is claimed is:

1. A servo motor controller that detects Z-phase signals of an incremental-type encoder that detects rotation of a servo motor to perform driving control of the servo motor, comprising:
  a position detection unit that detects a reference position of a rotating shaft of the servo motor on the basis of the Z-phase signal of the encoder;
  a signal interval detection unit that measures intervals of a plurality of detected Z-phase signals;
  an abnormality determination unit that determines that the Z-phase signal is abnormal when the interval measured by the signal interval detection unit is equal to or larger than a prescribed threshold; and
  a speed changing unit that changes a speed of the servo motor, wherein
  the speed changing unit changes the speed of the servo motor when the abnormality determination unit determines that the Z-phase signal is abnormal.

2. The servo motor controller according to claim 1, wherein the signal interval detection unit performs measurement again after the speed of the servo motor is changed.

3. The servo motor controller according to claim 2, further comprising: an abnormality notifying unit that notifies a host controller of an abnormality when the interval of the Z-phase signals is equal to or larger than a prescribed threshold with respect to a latest detection value or an average value of detection values for a prescribed period at a state where the speed of the servo motor was changed to a prescribed speed.

4. A servo motor controller that detects Z-phase signals of an incremental-type encoder that detects rotation of a servo motor to perform driving control of the servo motor, comprising:
  a position detection unit that detects a reference position of a rotating shaft of the servo motor on the basis of the Z-phase signal of the encoder;
  a signal interval detection unit that measures intervals of a plurality of detected Z-phase signals;
  an abnormality determination unit that determines that the Z-phase signal is abnormal when the interval measured by the signal interval detection unit is equal to or larger than a prescribed threshold; and
  an abnormality notifying unit that notifies a host controller of an abnormality when the interval of the Z-phase signals is equal to or larger than a prescribed threshold with respect to a latest detection value or an average value of detection values for a prescribed period at a state where a speed of the servo motor was changed to a prescribed speed.

* * * * *